US005501480A

United States Patent [19]

Ordelman et al.

[11] Patent Number: 5,501,480

[45] Date of Patent: Mar. 26, 1996

[54] AUXILIARY FRAME FOR A WHEELCHAIR AND WHEELCHAIR FOR USE WITH AN AUXILIARY FRAME

[76] Inventors: Hendrik J. Ordelman, Bosstraat 33, NL-7161 XX Neede; Gerhard Temmink, Wiedenbroeksingel 32, NL-7481 BT Haaksbergen; Herman W. H. Stokkers, Vonkenkaamp 3, NL-7482 GB Haaksbergen; Harm Braam, Spoelsterstraat 6, NL-7481 KG Haaksbergen, all of Netherlands

[21] Appl. No.: 253,730

[22] Filed: Jun. 3, 1994

[30] Foreign Application Priority Data

| | | | |
|---|---|---|---|
| Jun. 4, 1993 | [EP] | European Pat. Off. | 93201604.1 |
| Jul. 28, 1993 | [NL] | Netherlands | 9301322 |

[51] Int. Cl.$^6$ ....... B62M 1/14

[52] U.S. Cl. ....... 280/304.1; 280/250; 280/250.1; 180/13

[58] Field of Search ....... 280/304.1, 250.1, 280/242.1, 249, 250; 180/13, 12, 11, 907; 297/DIG. 4

[56] References Cited

U.S. PATENT DOCUMENTS

| | | | |
|---|---|---|---|
| 3,423,086 | 1/1969 | Moore | 280/304.1 X |
| 4,386,672 | 6/1983 | Cokes | 180/13 |
| 4,471,972 | 9/1984 | Young | 280/289 |
| 4,720,117 | 1/1988 | Hay | 280/250 |
| 5,050,695 | 9/1991 | Kleinwolterink, Jr. | 180/13 |
| 5,066,032 | 11/1991 | Van Vooren et al. | 280/304.1 |
| 5,207,286 | 5/1993 | McKelvey | 180/13 |
| 5,273,304 | 12/1993 | Berkheimer | 280/304.1 |
| 5,324,060 | 6/1994 | Van Vooren et al. | 280/304.1 |

FOREIGN PATENT DOCUMENTS

| | | | |
|---|---|---|---|
| 1540324 | 8/1968 | France . | |
| 2124985 | 2/1984 | United Kingdom | A61G 5/04 |

*Primary Examiner*—Kevin T. Hurley
*Attorney, Agent, or Firm*—Webb Ziesenheim Bruening Logsdon Orkin & Hanson

[57] ABSTRACT

An auxiliary frame for a wheelchair, the auxiliary frame having a coupling assembly for coupling the auxiliary frame to the wheelchair, at least one steerable wheel and a drive assembly. The coupling assembly is formed by a central elongate body provided with a bearing for co-action with the frame of the wheelchair and a clamping bracket pivotally connected to the elongate body and co-acting with the bearing. A stationary hook-like member is connected to the elongate body.

18 Claims, 8 Drawing Sheets

AUXILIARY FRAME FOR A WHEELCHAIR AND WHEELCHAIR FOR USE WITH AN AUXILIARY FRAME

BACKGROUND OF THE INVENTION

The invention relates to an auxiliary frame for a wheelchair comprising coupling means for coupling the auxiliary frame to the wheelchair, at least one steerable wheel and drive means, wherein the coupling means are formed by a central elongate body provided with a bearing for co-action with the frame of the wheelchair and a clamping bracket pivotally connected to the elongate body and co-acting with the bearing.

Known from the British patent publication GB-2124985 is a steerable drive unit for coupling to a wheelchair. The drive unit comprises drive and steering means whereby a person sitting in the wheelchair can drive and steer the wheelchair using a coupled drive unit. A drawback to the drive unit as described in the said patent publication is the complex coupling construction of the drive unit. It requires a great deal of effort to disconnect the drive unit or to connect it to the wheelchair.

SUMMARY OF THE INVENTION

The present invention has for its object to provide a simplified auxiliary frame for a wheelchair which can be coupled to a wheelchair by a wheelchair user in very simple yet stable manner and which is also very simple to disconnect. Despite the simple coupling operation the coupling connection must be operationally reliable and stable.

The invention provides for this purpose an auxiliary frame with the characteristic that the coupling means also comprise a stationary hook-like member connected to the elongate body. When the wheelchair and the auxiliary frame have to be coupled, the wheelchair user moves the wheelchair partly over the elongate body. The elongate body herein preferably urges the front part of the wheelchair upward such that the front wheels are lifted free of the ground. The coupling position is reached in that the hook-like member engages round a tube of the frame of the wheelchair. For the coupling the clamping bracket now only has to be displaced from a non-clamping position to a clamping position. The wheelchair user can thus mutually connect the wheelchair and the auxiliary frame in very simple manner with one hand. When disconnecting the auxiliary frame and the wheelchair the clamping bracket must be placed in a non-clamping position whereafter the wheelchair can be moved away from the auxiliary frame.

A preferred embodiment is characterized in that the coupling means also comprise locking means, which locking means are formed by a member pivotally connected to the clamping bracket and a stop connected to the elongate body. These easy to operate locking means prevent undesired detachment of the coupling means.

The drive means are preferably formed by a manual drive, by a combustion engine, by an electric motor or by a combination of these drives. These drives are relatively voluminous and/or heavy and usually particularly suitable for outdoor use. Particularly in the case of such drives it is attractive to be able to disconnect them from the wheelchair in small spaces.

In a preferred embodiment the hook-like member is connected at an adjustable position to the elongate body. The distance of the wheel to the elongate body is preferably adjustable. With the above mentioned adjustment options an auxiliary frame can be adapted to wheelchairs of different dimensions.

The wheelchair for use with an auxiliary frame as described in the foregoing is preferably characterized in that the wheelchair is provided with at least one connecting member connected to the wheelchair and consisting of an annular element placed round a tube for co-action with the coupling means. It is thus possible to guarantee a precise fit of the wheelchair to the coupling means. In addition the wheelchair frame can be protected against damage caused by the coupling means of the auxiliary frame.

The wheelchair is further preferably characterized in that the connecting member is provided with at least one locating edge for positioning the auxiliary frame in relation to the wheelchair. It thus becomes possible to connect the auxiliary frame to the Wheelchair at a desired position.

BRIEF DESCRIPTION OF THE DRAWINGS

The present invention will be further elucidated with reference to the annexed figures in which a preferred embodiment is shown non-limitatively. Herein.

DESCRIPTION OF THE PREFERRED EMBODIMENTS

Figure 1:
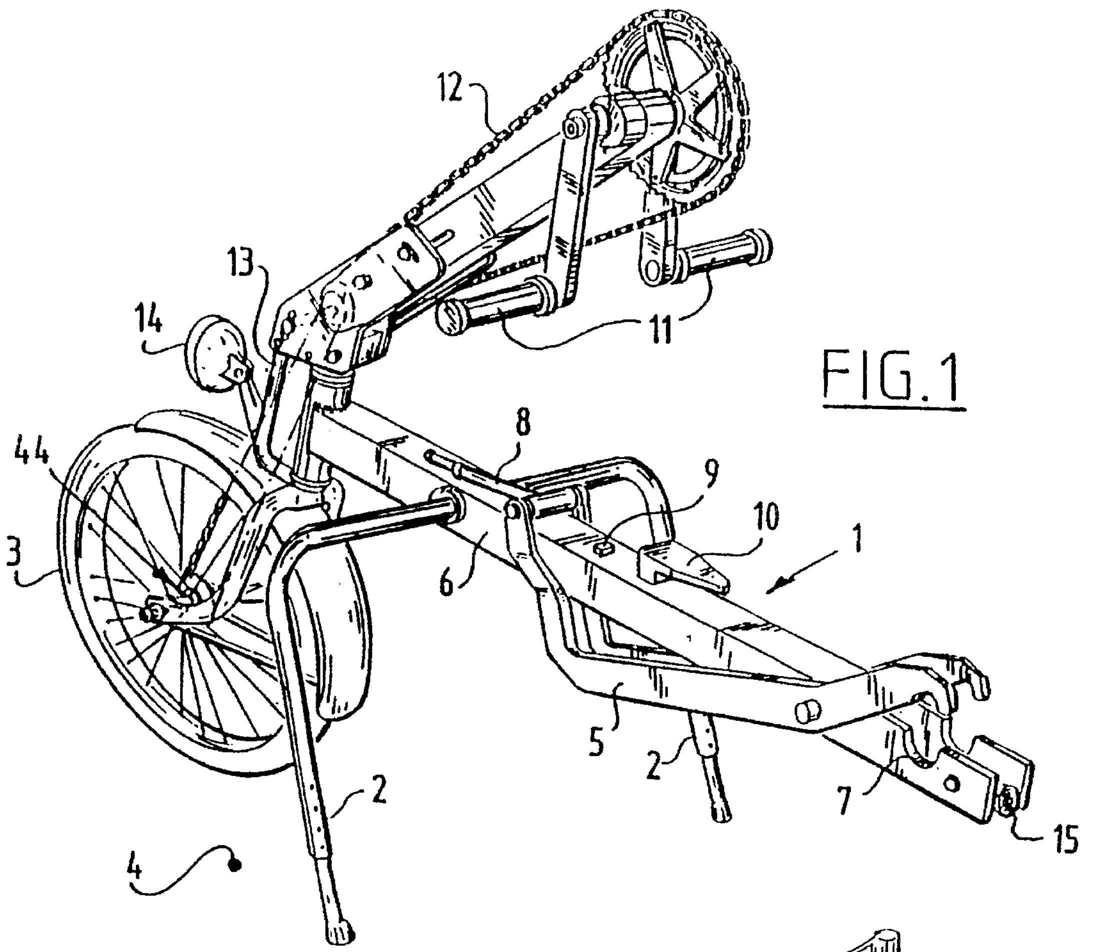
FIG. 1 shows a perspective view of an auxiliary frame according to the invention.

FIG. 1 shows an auxiliary frame 1 which stands with two legs 2 and a wheel 3 on the ground 4. A clamping bracket 5 shown herein in opened position is pivotally connected to a central elongate body 6 provided with a bearing 7. A pivotable member 8 is connected to clamping bracket 5 such that it can co-act with a protrusion 9 arranged on elongate body 6. The central elongate body 6 is moreover provided with a hook-like gripping member 10. The drive is formed by a chain 12 engaging on the wheel 3 and driven by handgrips 11. The hub 44 of wheel 3 can be provided with a gear and/or a so-called back-pedalling brake. To transmit the forces exerted on handgrips 11 to the wheel 3 the auxiliary frame 1 is provided with a reinforcing bracken 13. In order to also enable use of the auxiliary frame 1 in the dark it is provided with a front light 14 and a rear light 15.

Figure 2:
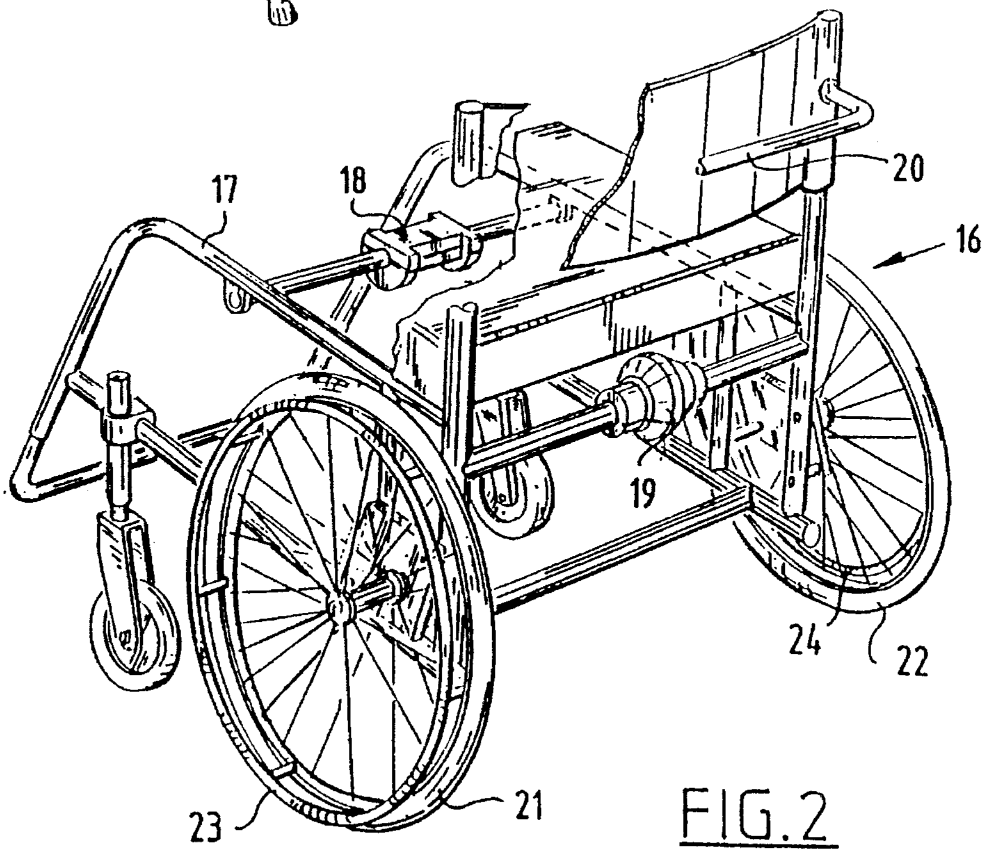
FIG. 2 shows a partly broken away perspective view of a wheelchair according to the invention.

FIG. 2 shows a wheelchair 16 which can co-act with auxiliary frame 1 of FIG. 1, wheelchair 16 comprises a frame 17 onto which the auxiliary frame 1 can engage. In order to prevent frame 17 being damaged and to position auxiliary frame 1 relative to frame 17 the latter is provided with connecting members 18, 19. In the situation shown in FIG. 2 the wheelchair 16 can be moved forward by an ambulatory person taking hold of wheelchair 16 by a bar 20 and pushing it forward or by a person sitting in wheelchair 16 driving the drive rings 23, 24 connected to the respective wheelchair wheels 21, 22.

Figure 3:
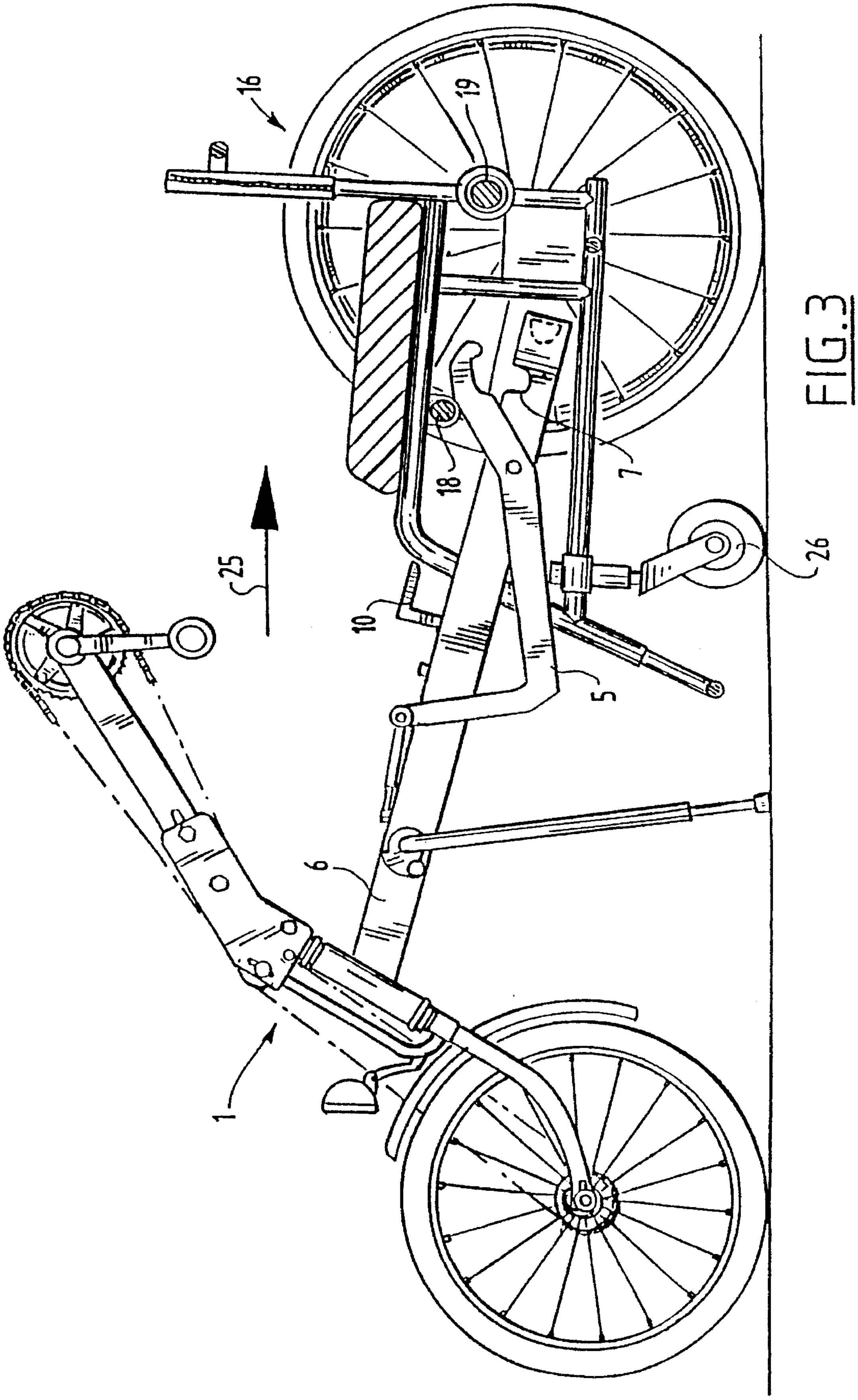
FIG. 3 is a side view of an auxiliary frame and a wheelchair according to the invention which are not mutually coupled.
Figure 4:
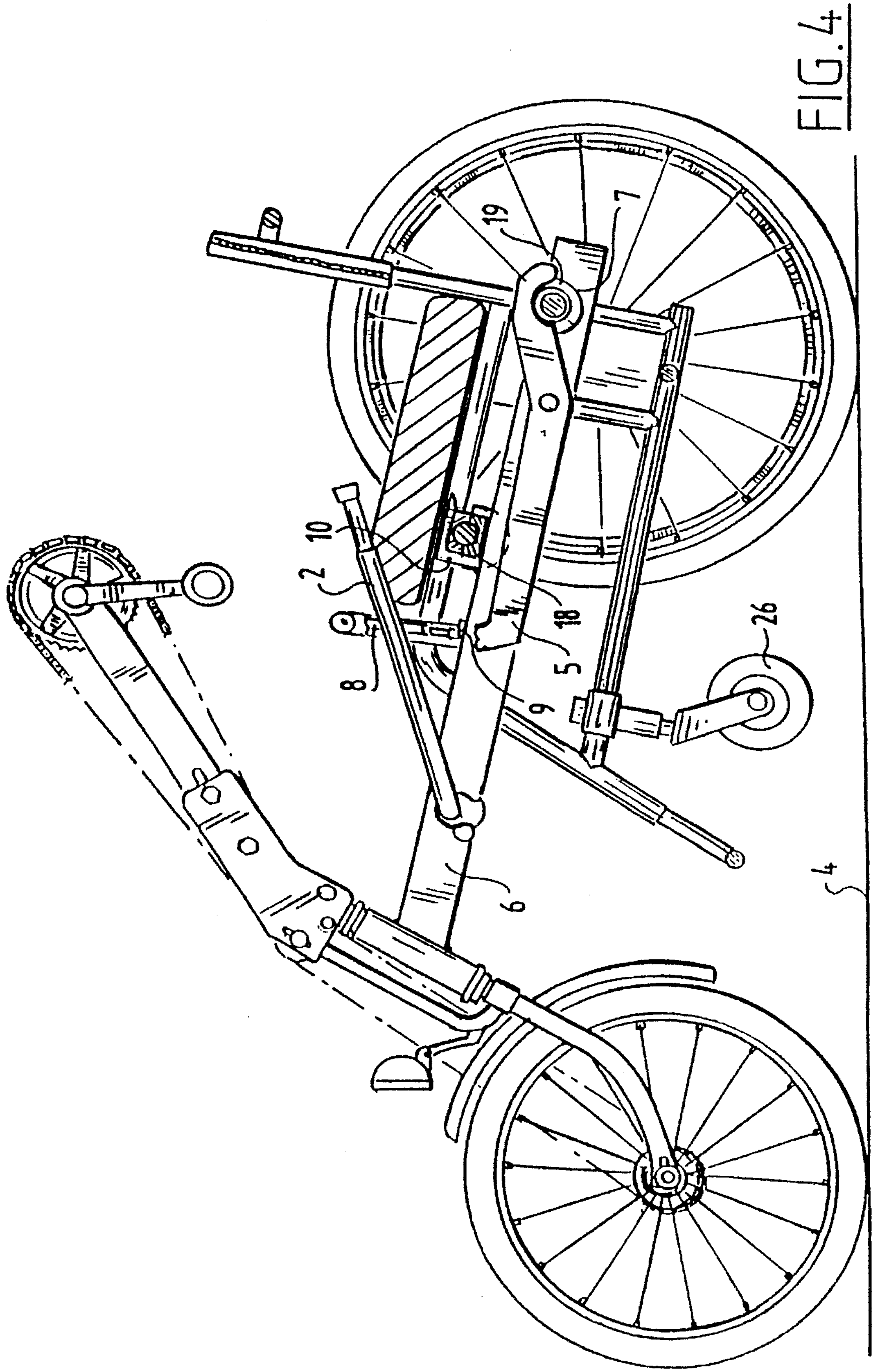
FIG. 4 is a side view of an auxiliary frame coupled to a wheelchair.

FIG. 3 shows the auxiliary frame 1 placed in front of wheelchair 16 in non-coupled position. By moving auxiliary frame 1 as according to arrow 25 toward wheelchair 16 they can be mutually coupled. Auxiliary frame 1 must herein be moved so far in the direction of arrow 25 that the bearing 7 of the central elongate body 6 with the clamping bracket 5 can fix the connecting member 19 connected to wheelchair 16 and the hook-like gripping member 10 engages the connecting member 18 connected to the wheelchair. As the coupling is effected castors 26 arranged on the front side of the wheelchair 16 are raised from the ground. When the coupling has taken place a situation results as shown in FIG. 4. The clamping bracket 5 and the bearing 7 arranged in the central elongate body 6 clamp in the connecting member 19. This clamping situation is locked in that the pivotable member 8 lies against the protrusion 9. The hook-like gripping member 10 engages the connecting member 18. As already described in the foregoing, the castors 26 have been raised from the ground 4. The legs 2 have moreover been folded up.

Figure 5:
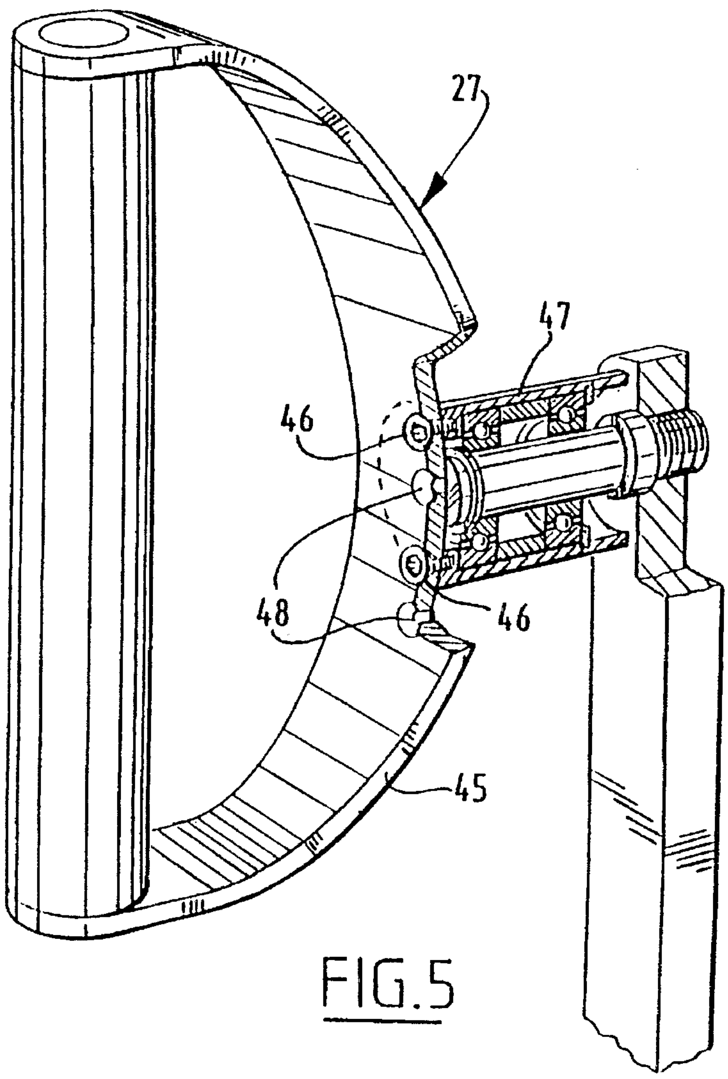
FIG. 5 shows a partly broken away perspective view of a handgrip for use with an auxiliary frame according to any of the foregoing figures.

FIG. 5 shows an alternatively embodied handgrip 27 with which the chain 12 shown in the preceding figures can likewise be driven. Due to this modified construction the arms will assume during driving of the auxiliary frame a position other than during driving of an auxiliary frame as shown in FIGS. 1–4. A bracket 45 of hand grip 27 is fastened using bolts 46 to a bearing bush 47. Bracket 45 is provided with a number of additional apertures 48 whereby the bracket 45 can be fastened in a number of positions to bearing bush 47.

Figure 6:
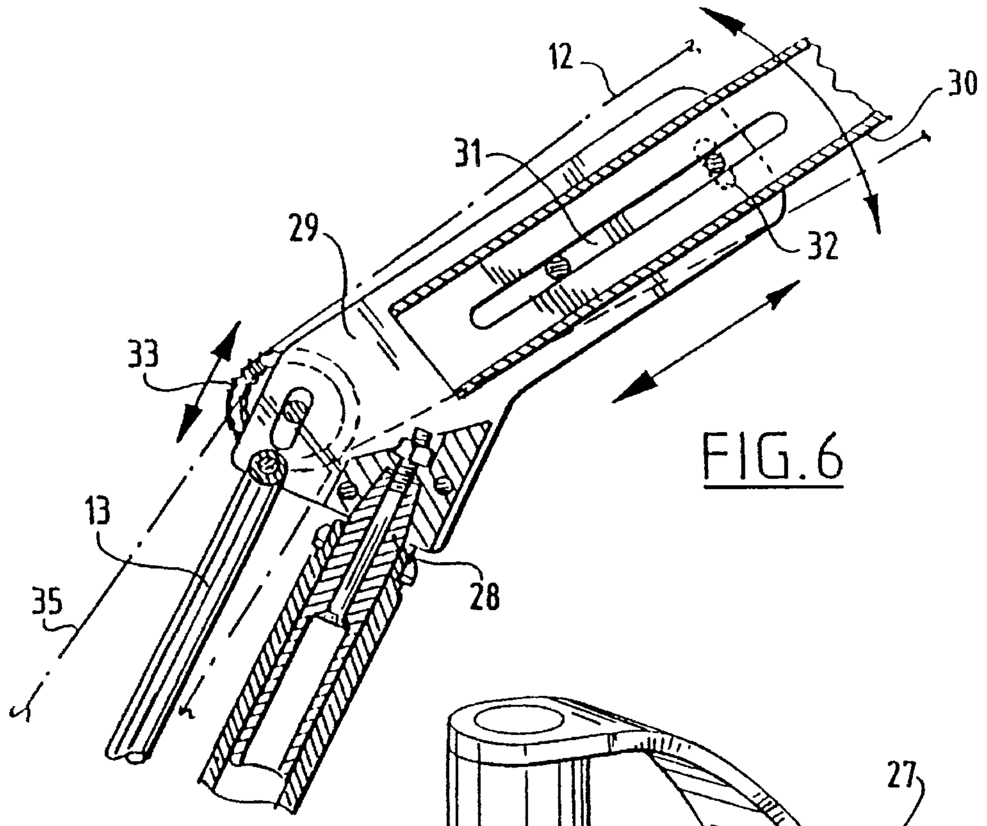
FIG. 6 is a side view of the adjustment possibilities of the drive means of an auxiliary frame.

FIG. 6 shows the adjustment possibilities of the drive and steering. A pin with conical extremity 28 connected to wheel 3 is received in a coupling piece 29. The latter is also connected to the reinforcing bracket 13. The position of the handgrips (not shown) is adjustable relative to coupling piece 29. This is realized in that a rod 30 connected to the handgrips can be fixed in a variable position relative to coupling piece 29 through a slot 31 arranged in rod 30 and a slot 32 arranged in coupling piece 29. Further fixed to coupling piece 29 is a double sprocket wheel 33 with which a force applied to the chain 12 can be transmitted to another chain 35. The transmission ratio can be determined by selecting a determined ratio between the toothed wheels of the double sprocket wheel 33. It is also possible here for instance to place a derailleur in order to adjust at choice the desired transmission ratio. The double sprocket wheel 33 can be connected at an adjustable position to the coupling piece 29, and it thus becomes possible to vary the tension on the chains 12, 35.

Figure 7:
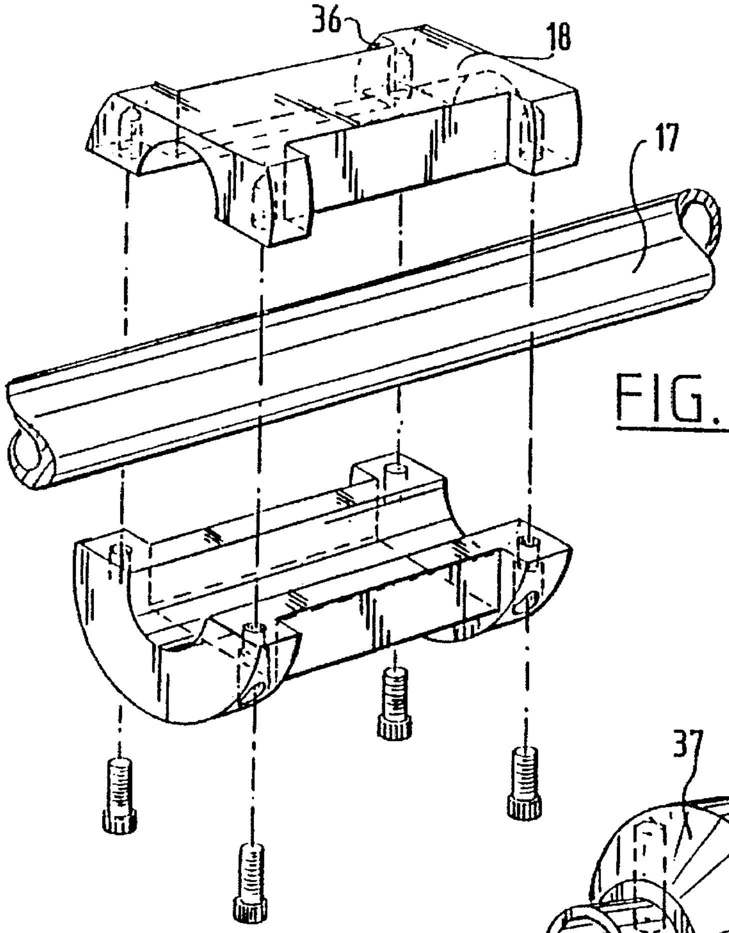
FIGS. 7 and 8 show perspective views of connecting members connectable to the wheelchair.
Figure 8:
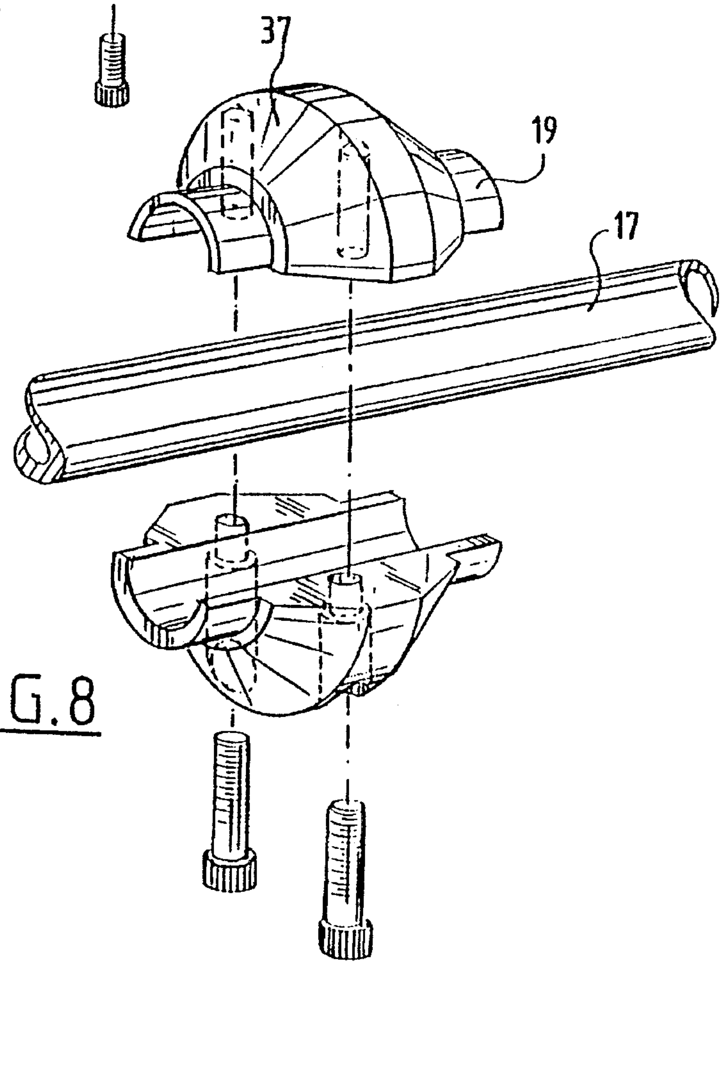

FIG. 7 and 8 show coupling pieces 18, 19 connectable to the frame 17 of wheelchair 16. Coupling pieces 18, 19 are provided respectively with locating edges 36, 37 for placing auxiliary frame 1 in the desired position relative to wheelchair 16. In addition the connecting members 18, 19 prevent the frame 17 of wheelchair 16 being damaged when it is engaged by auxiliary frame 1.

Figure 9:
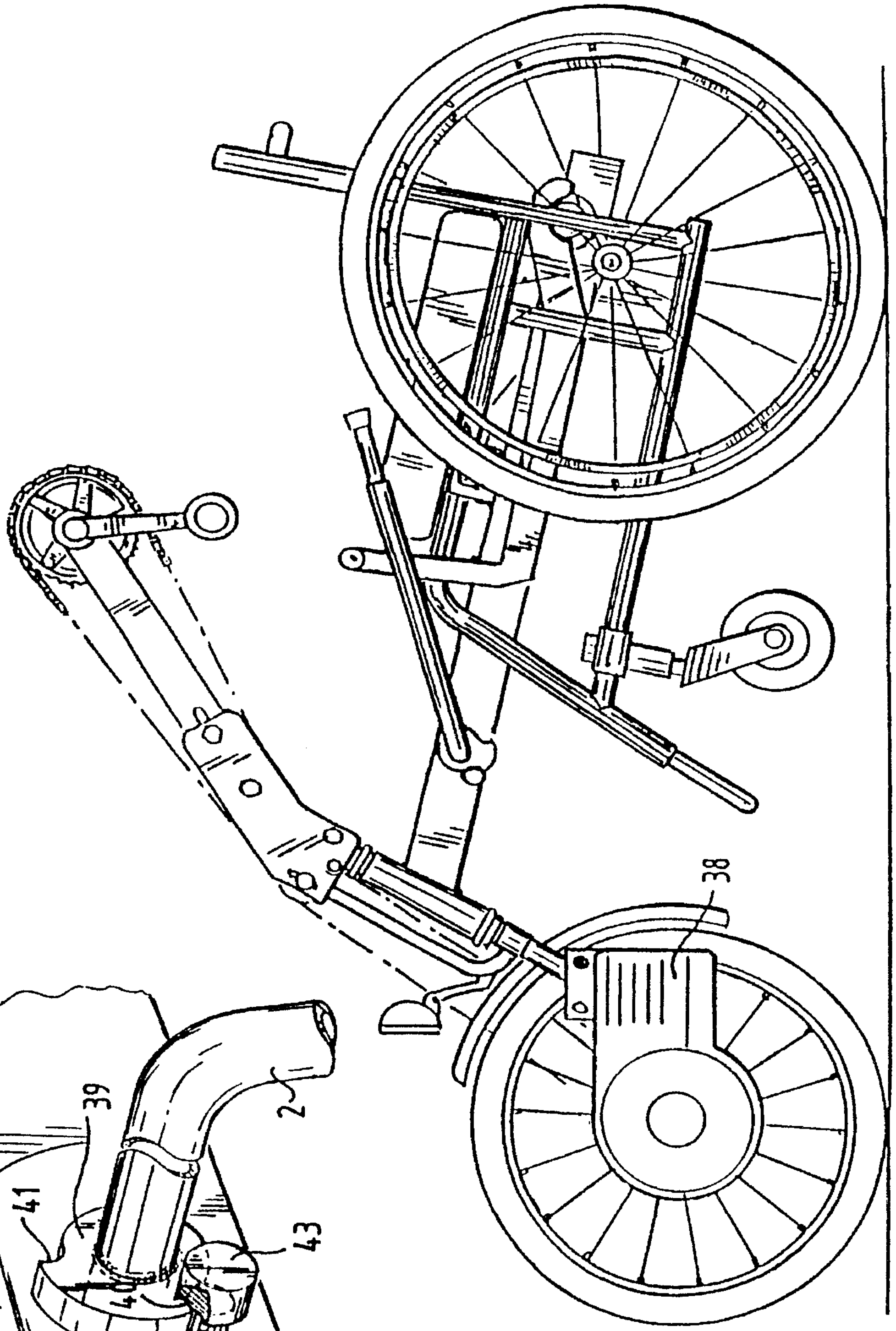
FIG. 9 shows a side view of an auxiliary frame provided with a motor.

The auxiliary frame shown in FIG. 9 is provided with a motor 38 in addition to the previously shown manual drive. Motor 38 may be a combustion engine with a corresponding combustion drive or an electric motor having a corresponding electric drive.

Figure 10:
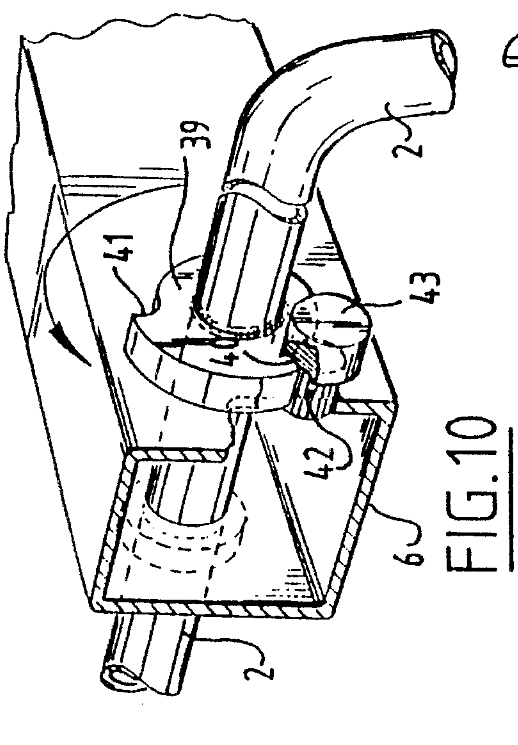
FIG. 10 is a perspective view of a connection between a central elongate body and legs.

FIG. 10 shows the connection of the legs 2 to the central elongate body 6. A disc 39 fixedly connected to leg 2 is provided with two stops 40, 41 which co-act with a pin 42 connected to the central elongate body 6 when the leg 2 is folded downward the one stop 40 makes contact with pin 42 and when leg 2 is folded upward the other stop 41 makes contact with pin 42. The folded up leg 2 forms a protection for the legs of the wheelchair user. In order to prevent leg 2 becoming detached from the central elongate body 6 the pin 42 is provided with a broader head 43 which falls over the disc 39.

Figure 11:
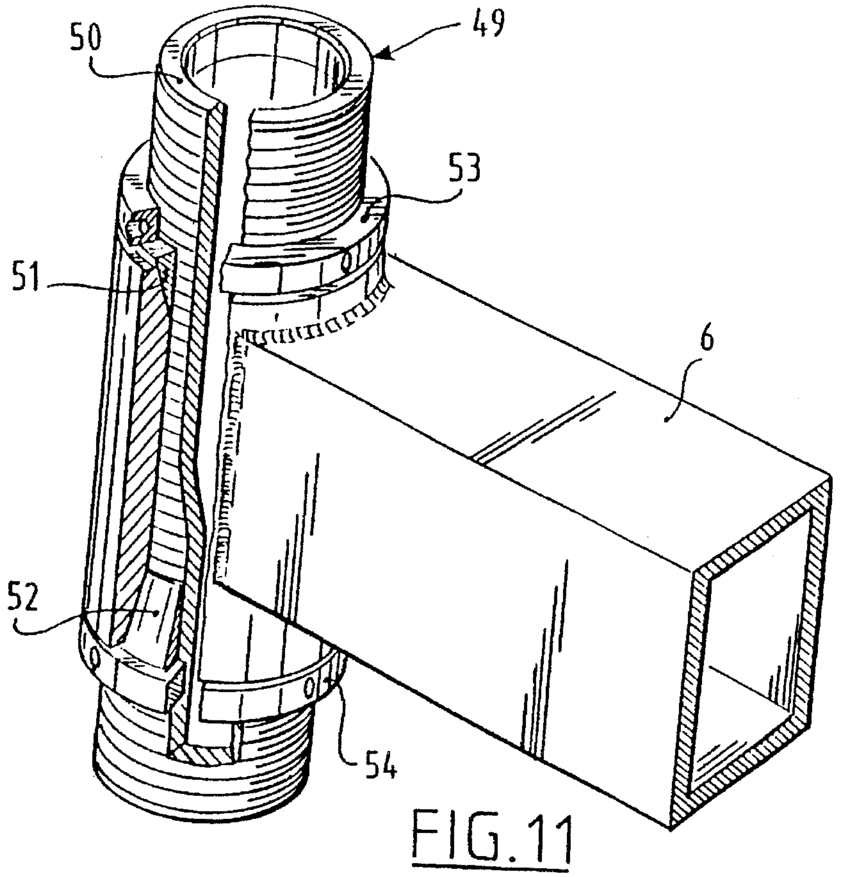
FIG. 11 is a perspective view of a height-adjustable steering head for a steering pin.

FIG. 11 shows a height-adjustable steering head 49, wherein a guide sleeve 50 is connectable at an adjustable position to the central elongate body 6 by means of wedge-shaped clamping rings 51, 52 which co-act with adjusting rings 53, 54.

Figure 12:
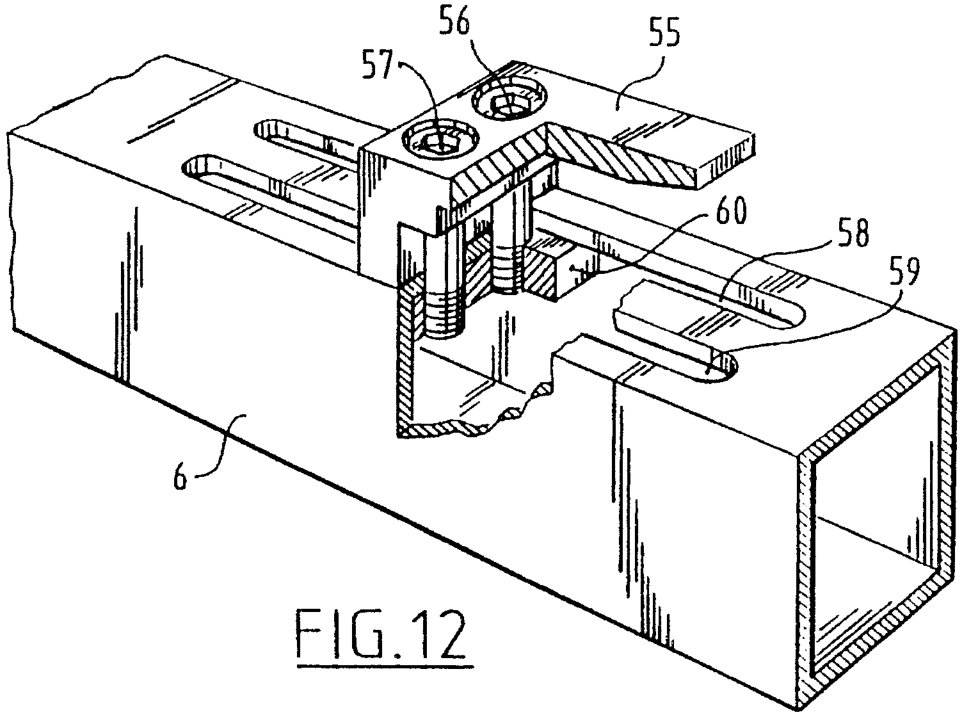
FIG. 12 is a perspective view of an adjustable hook-like member.

FIG. 12 shows a hook-like member 55 which is connectable at an adjustable position to the central elongate body 6 by means of bolts 56, 57 which protrude through slots 58, 59 in the central elongate body 6 and which engage into a clamping body 60.

Figure 13:
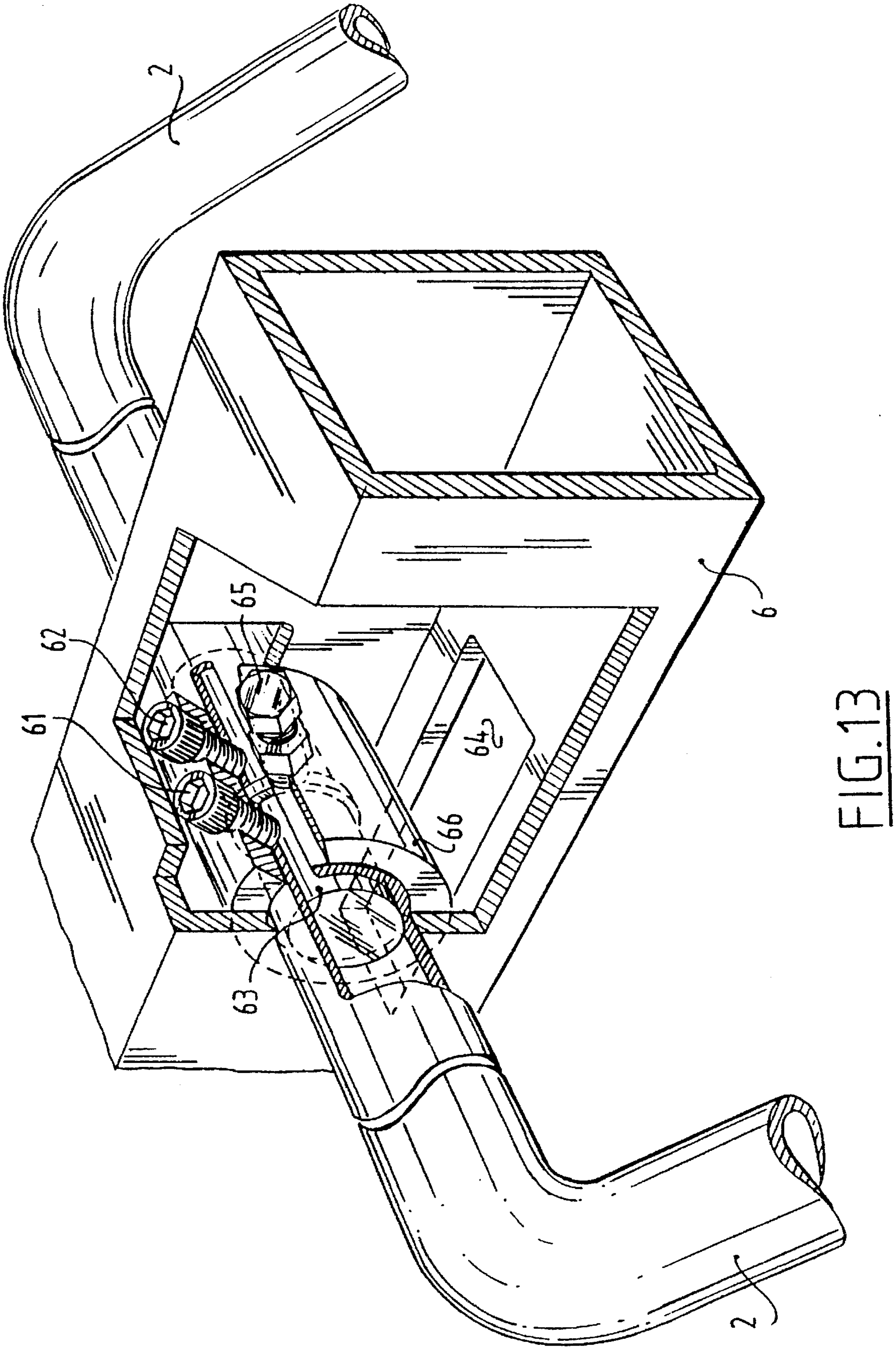
FIG. 13 is a cut away perspective view of an alternative connection between a central elongate body and legs.

FIG. 13 shows an alternative connection of the legs 2 to the central elongate body 6. Legs 2 are fastened by means of clamping bolts 61, 62 to a core 63. Bolts 61, 62 are accessible via an opening 64 in the central elongate body 6. Bolts 61, 62 also serve as stop against the top part of the central elongate body 6. A stop bolt 65 is arranged in an external cylinder 66 as second stop. The clamping bolts 61, 62 are also rotatable in cylinder 66. The legs 2 are thus clamped between the core 63 and the cylinder 66.

What is claimed is:

1. An auxiliary frame for a wheelchair, comprising: coupling means for coupling the auxiliary frame to the wheelchair, at least one steerable wheel and drive means, wherein the coupling means are formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body, and wherein the coupling means also includes locking means, which locking means are formed by a member pivotally connected to the clamping bracket and a stop connected to the elongate body.

2. An auxiliary frame for a wheelchair as claimed in claim 1, wherein the drive means are formed by an electric motor.

3. An auxiliary frame for a wheelchair as claimed in claim 1, wherein the drive means are formed by a manual drive.

4. An auxiliary frame for a wheelchair as claimed in claim 1, wherein the hook-like member is connected at an adjustable position to the elongate body.

5. An auxiliary frame for a wheelchair as claimed in claim 4, wherein the distance of the wheel to the elongate body is adjustable.

6. An auxiliary frame for a wheelchair as claimed in claim 1, wherein the drive means are formed by an electric motor.

7. An auxiliary frame for a wheelchair as claimed in claim 6, wherein the hook-like member is connected at an adjustable position to the elongate body.

8. An auxiliary frame for a wheelchair as claimed in claim 7, wherein the distance of the wheel to the elongate body is adjustable.

9. An auxiliary frame for a wheelchair, comprising: coupling means for coupling the auxiliary frame to the wheelchair, at least one steerable wheel and drive means, wherein the coupling means is formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body and wherein the drive means is formed by a manual drive.

10. An auxiliary frame for a wheelchair, comprising: coupling means for coupling the auxiliary frame to the wheelchair, at least one steerable wheel and drive means, wherein the coupling means is formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body and wherein the drive means is formed by a combustion engine.

11. An auxiliary frame for a wheelchair, comprising: coupling means for coupling the auxiliary frame to the wheelchair, at least one steerable wheel and drive means, wherein the coupling means is formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body and wherein the drive means is formed by a combination of a manual drive and a combustion drive.

12. An auxiliary frame for a wheelchair, comprising: coupling means for coupling the auxiliary frame to the wheelchair, at least one steerable wheel and drive means, wherein the coupling means are formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body, and wherein the hook-like member is connected at an adjustable position to the elongate body.

13. An auxiliary frame for a wheelchair, comprising: coupling means for coupling the auxiliary frame to the wheelchair, at least one steerable wheel and drive means, wherein the coupling means is formed by a central elongate body provided with a bearing for co-action with a frame of the wheelchair and a clamping bracket pivotally connected to the elongate body and co-acting with the bearing, wherein the coupling means also includes a stationary hook-like member connected to the elongate body and wherein the distance of the wheel to the elongate body is adjustable.

14. A combination of an auxiliary frame for a wheelchair and a wheelchair having a frame, wherein the auxiliary frame comprises coupling means for coupling the auxiliary frame to the wheelchair, at least one steerable wheel and drive means, wherein the coupling means is formed by a central elongate body provided with a bearing for co-action with the frame of the wheelchair and a clamping bracket pivotally connected to the elongate body and co-acting with the bearing, wherein the coupling means also includes a stationary hook-like member connected to the elongate body, wherein the drive means includes a manual drive and wherein the wheelchair is provided with at least one connecting member connected to the wheelchair, the connecting member comprising an annular element placed round a tube for co-action with the coupling means.

15. The combination as claimed in claim 14, wherein the connecting member is provided with at least one locating edge for positioning the auxiliary frame in relation to the wheelchair.

16. An auxiliary frame for a wheelchair having a frame, comprising: coupling means for coupling the auxiliary frame to the wheelchair, at least one steerable wheel and drive means, wherein the coupling means is formed by a central elongate body provided with a bearing for co-action with the frame of the wheelchair and a clamping bracket pivotally connected to the elongate body and co-acting with the bearing, wherein the coupling means also includes a stationary hook-like member connected to the elongate body and wherein the drive means includes a combination of a manual drive and an electric drive.

17. A combination of an auxiliary frame for a wheelchair and a wheelchair having a frame, wherein the auxiliary frame comprises coupling means for coupling the auxiliary frame to the wheelchair, at least one steerable wheel and drive means, wherein the coupling means is formed by a central elongate body provided with a bearing for co-action with the frame of the wheelchair and a clamping bracket pivotally connected to the elongate body and coacting with the bearing, wherein the coupling means also includes a stationary hook-like member connected to the elongate body, wherein the drive means includes a manual drive and wherein the wheelchair is provided with at least one connecting member connected to the wheelchair, the connecting member comprising an annular element placed round a tube for co-action with the coupling means.

18. The combination as claimed in claim 17, wherein the connecting member is provided with at least one locating edge for positioning the auxiliary frame in relation to the wheelchair.

* * * * *